United States Patent [19]

Edwards

[11] 4,399,480
[45] Aug. 16, 1983

[54] HEAD ACCESS DOOR, OPENING MECHANISM AND METHOD OF SEALING

[75] Inventor: Roy J. Edwards, San Jose, Calif.

[73] Assignee: Disctron, Inc., Milpitas, Calif.

[21] Appl. No.: 248,807

[22] Filed: Mar. 30, 1981

[51] Int. Cl.³ .................. G11B 23/02; G11B 15/32; G03B 1/04; G01D 15/24

[52] U.S. Cl. .................. 360/132; 242/199; 360/105

[58] Field of Search ............ 360/132, 131, 134, 85; 346/134; 242/199; 360/105

[56] References Cited

U.S. PATENT DOCUMENTS

| | | | |
|---|---|---|---|
| 3,759,465 | 9/1973 | Janssen | 360/132 |
| 4,021,006 | 5/1977 | Morimoto | 360/132 |
| 4,045,821 | 8/1977 | Fujikura | 360/132 |
| 4,093,149 | 6/1978 | Shroff | 360/132 |
| 4,173,319 | 11/1979 | Umeda | 242/199 |
| 4,235,395 | 11/1980 | Wardenaar | 360/132 |
| 4,315,289 | 2/1982 | Holecek | 360/105 |

Primary Examiner—Robert M. Kilgore

Attorney, Agent, or Firm—Spensley, Horn, Jubas & Lubitz

[57] ABSTRACT

A head access door mechanism for a cartridge containing a magnetic disc is described. The mechanism employs a bellcrank, located inside the cartridge, to which the door for the head access opening is coupled. The door slides in grooves located along the top and bottom of the side of the cartridge. The bellcrank is spring-loaded and forces the door closed and inward against a seal located around the head access opening. An interfering lip located along the inside of the groove slightly beyond the end of the door when the door is in the closed position interferes with the door so that it cannot be opened by a force applied directly to the door at the head access opening which would tend to slide the door within the groove. When inserted into a disc-drive assembly, a pin in the disc-drive assembly exerts a force on the second arm of the bellcrank to overcome the spring-loading. This causes the door the move away from the sealing surface surrounding the head access opening and outward past the interfering lip, permitting the door to slide open.

17 Claims, 8 Drawing Figures

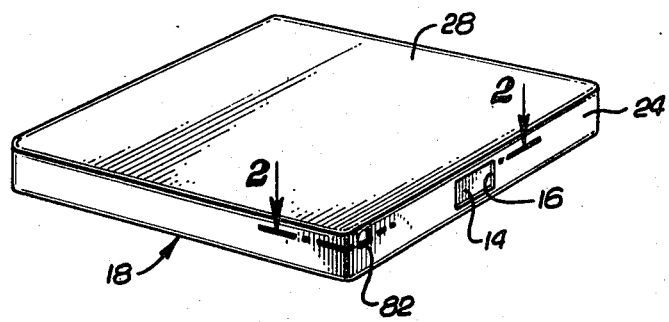
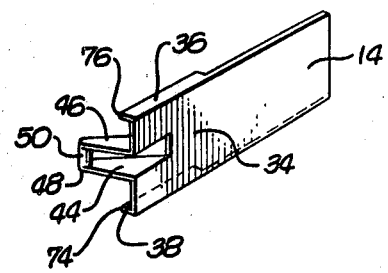
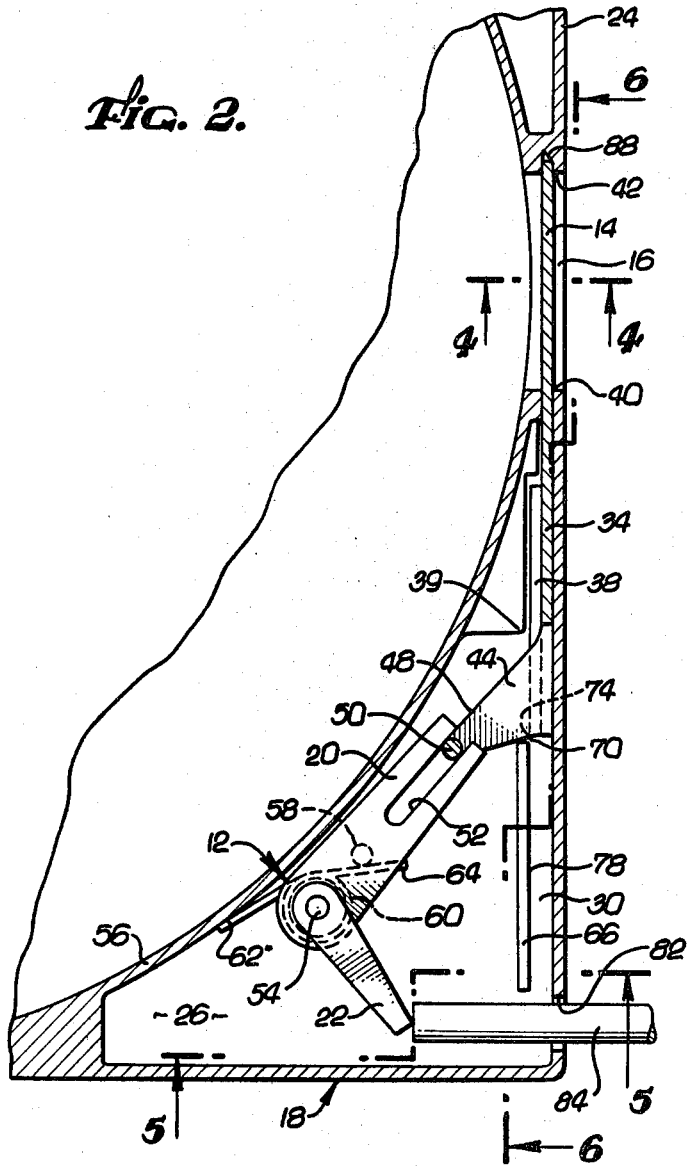
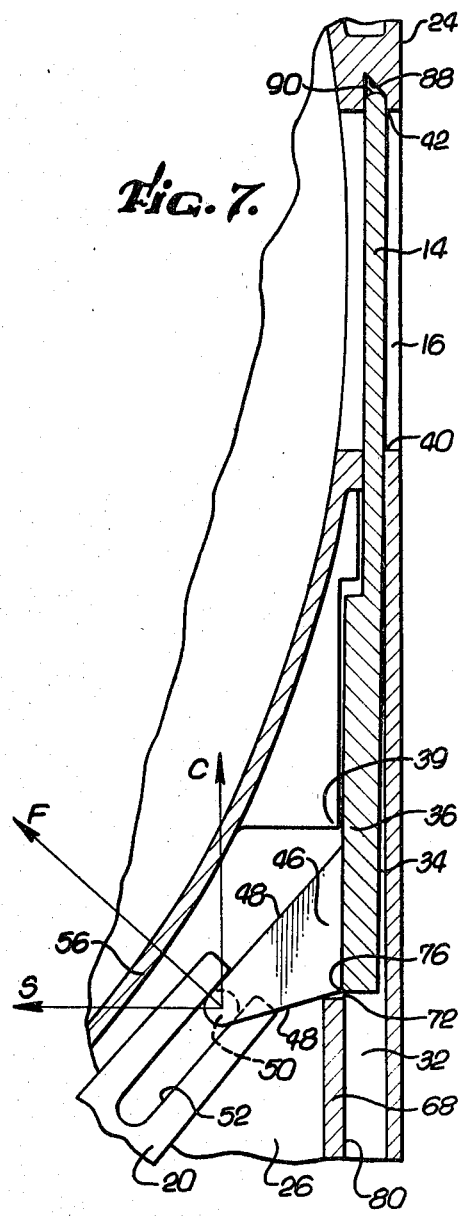

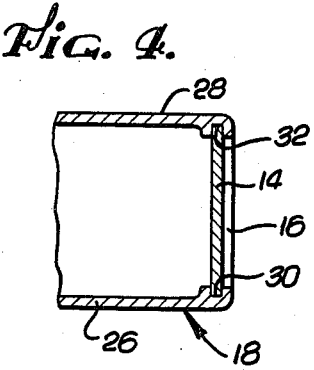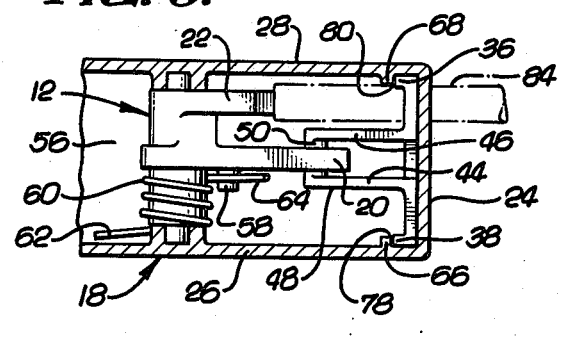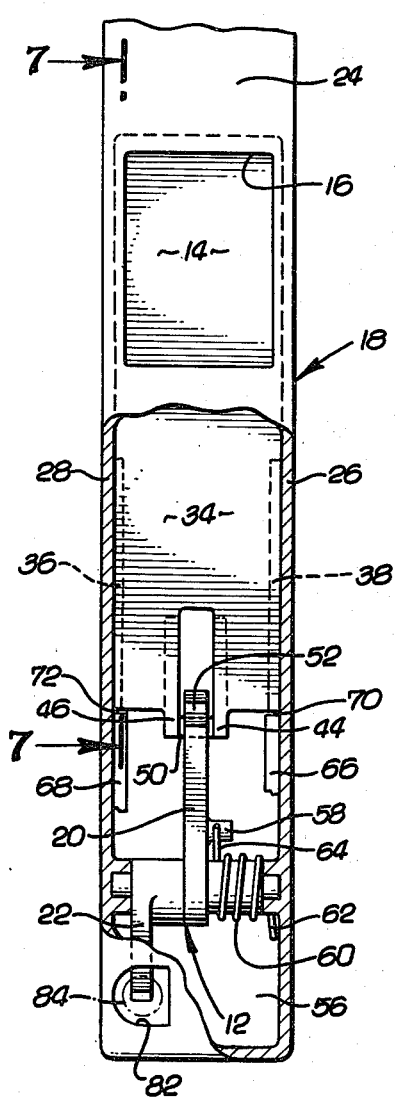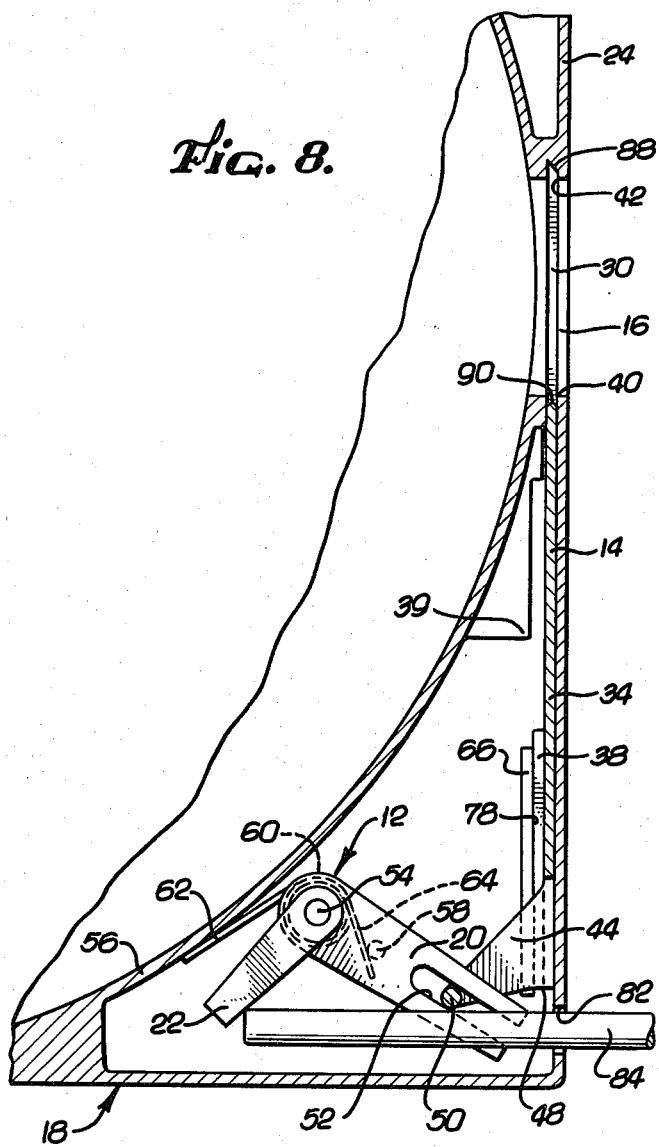

HEAD ACCESS DOOR, OPENING MECHANISM AND METHOD OF SEALING

BACKGROUND OF THE INVENTION

1. Field of the Invention

This invention concerns a door and door mechanism for the head access opening in a cartridge containing a magnetic disc or the like, in which the door seals around the head access opening when closed and is prevented from inadvertently opening by a locking mechanism.

2. Prior Art

Sliding head access doors have been previously used in commercially available cartridges. The operating mechanism for these doors requires that an extension of the door be made flexible so that it can bend at 90° around an opening mechanism. In this arrangement, there is considerable friction between the extension of the door and the track in which it runs, causing the door operation to be unreliable. Further, because the extension of the door is required to be flexible, the choice of materials for the door is thereby limited. Not only do these head access doors not provide good sealing, but it is possible to push the door open with a finger or thumb when the cartridge is out of the disc-drive unit and hence to allow the ingress of contaminants into the cartridge, there not being a locking mechanism to prevent this such as in the present invention.

In U.S. Pat. No. 4,045,821, a cartridge for tape which has a shutter with a self-locking mechanism is described. That locking mechanism makes use of a U-shaped detent 45 having pawls 49 which fit into recesses at 125 (FIG. 11A of that patent). However, the described arrangement substantially differs from the present invention.

SUMMARY OF THE INVENTION

An object of the present invention is to provide a door and door mechanism for a head access opening for a cartridge containing a magnetic disc which effectively seals the cartridge from the ingress of contaminants when not in use. Hence, it is also an object of the present invention to provide a head access door and door mechanism which cannot be inadvertently opened, but can be opened only by proper insertion of the cartridge into the disc drive assembly. A third object of the present invention is to provide a door and door mechanism which functions more reliably than the prior art mechanisms now in use.

To achieve the above objects, the present invention comprises a substantially flat door which slides in grooves located along the top and bottom of that side of the cartridge which contains the head access opening. An extension of the door contains a yoke structure extending inward and carrying a vertically oriented pin. A spring-loaded bellcrank pivoting about a vertical axis has a first arm containing a slot in which the pin rides. The spring-loading of the bellcrank forces the door to slide closed over the head access opening and to move inward against a seal located around the periphery of the head access opening, thereby effectively sealing the cartridge from the ingress of contaminants when not in use.

The grooves in which the door slides are sized to fit tightly around the door in the area adjacent to the head access opening. However, beyond the area adjacent to the head access opening in which the extension of the door is situated when the door is closed and in which the door and its extension slide when opening, the grooves provide a much looser fit around the door, there being no inside side for the grooves in the area immediately adjacent to the location of the door extension when the door is in the closed position.

Beginning slightly beyond the end of the door extension when the door is in the closed position are small lips which actually form the inside sides for a portion of the grooves. When the door is in the closed position, the absence of inside sides for the grooves in the area adjacent to the door extension allows the end of the door extension to be pulled inward beyond the edges of the lips, so that the door extension interferes with the end of the lips when a force tending to slide the door open is applied in the area of the head access opening. Thus, the door is effectively locked and the carriage is protected from accidental exposure to contamination resulting from an inadvertent opening of the door.

The head access door is automatically properly opened when the cartridge is inserted into a disc-drive assembly. This is accomplished by a door operating pin in the disc-drive assembly which enters the cartridge through a small opening in the side and presses on the second arm of the bellcrank to overcome the spring-loading of the bellcrank. This force by the door operating pin causes the first arm to push the pin and yoke assembly and hence the door (1) outward past the lips, so that the door is no longer locked, and (2) away from the head access opening along the grooves, thereby opening the door.

BRIEF DESCRIPTION OF THE DRAWING

FIG. 1 is a perspective view of a cartridge for a magnetic disc in which the present invention is employed.

FIG. 2 is an overhead view of the door and door mechanism of the present invention taken along sectional lines 2—2 in FIG. 1, below the top of the cartridge, with the door in the closed position.

FIG. 3 is a perspective view of the door and associated components used in the present invention.

FIG. 4 is a sectional view of the present invention taken along the lines 4—4 in FIG. 2 showing the door and the cartridge in the vicinity of the head access opening.

FIG. 5 is a sectional view of the present invention taken along the lines 5—5 in FIG. 2.

FIG. 6 is a side view of the present invention taken along lines 6—6 of FIG. 2.

FIG. 7 is a detailed view of a portion of the present invention taken along the lines 7—7 in FIG. 6.

FIG. 8 is an overhead view of the door and door mechanism of the present invention, similar to that shown in FIG. 2, but with the door in the open position.

DESCRIPTION OF A PREFERRED EMBODIMENT OF THE INVENTION

The door and door opening mechanism of the present invention is used in conjunction with a cartridge containing a disc which is or may be magnetically coded with information. The present invention provides a door which covers the opening in the side of the cartridge through which a magnetic transducer head or heads may be introduced to read or write upon the magnetic disc. Such a door is necessary in order to protect the magnetic disc, when not in use, from the environment, i.e., from particulate matter and other contaminants which could possibly have deleterious effects upon the magnetic surfaces of the disc or other mechanisms within the cartridge if allowed to enter the cartridge.

The present invention is unique in using a bellcrank 12 coupled through a first arm 20 to a door 14 in order to close and seal the door 14 over the head access opening 16 when the cartridge 18 is not in use and to lockingly position the door 14 so that it cannot be inadvertently opened by a force applied to it in the area of the head access opening 16. The same bellcrank 12 is used to open the door 14 by means of a pin 84 in the disc-drive assembly into which the cartridge 18 is inserted. This door operating pin 84 presses upon a second arm 22 of the bellcrank, thereby forcing the first arm 20 to push the door 14 out of its locked position and to slide the door 14 open so that it no longer covers the head access opening 16.

The detailed structure and proper operation of the present invention can be understood with reference to FIGS. 1 through 8. The head access opening 16 through which the magnetic transducer heads for reading and/or writing upon the magnetic disc enter the cartridge is located along a side 24 of the cartridge between the cartridge bottom 26 and top 28. The door 14, which closes over the head access opening 16, is a substantially flat member which slides in grooves 30 and 32, located in the side 24 of the cartridge 18 along the bottom and top respectively. The grooves 30 and 32 can be seen in cross section in FIGS. 4 and 5.

The door 14 itself has an extension 34 integrally formed with the door 14, as seen in FIG. 2. The door extension 34 extends on one side of the head access opening 16 and at its top 36 and its bottom 38 is somewhat wider than the door 14. Correspondingly, beyond the area adjacent to the head access opening 16, the grooves 30 and 32 are wider than they are in the area immediately adjacent to the head access opening 16, and in fact in the area immediately adjacent to edge 39, the grooves 30 and 32 do not have an inside edge.

Attached to the end of the door extension 34 are two flat stiffened members 44 and 46 which extend inward. Members 44 and 46 are parallel to the bottom 26 and the top 28 of the cartridge 18 and are vertically separated from one another, thus forming a yoke structure 48. This yoke structure 48 is located approximately midway between the bottom 26 and the top 28 of the cartridge 18. Between the ends of the members 44 and 46 of the yoke structure 48 is attached a pin 50 having a circular cross-section. The door 14 and these components are shown in FIG. 3.

As seen in FIG. 2, the pin 50 rides in a slot 52 located in the first arm 20 of the bellcrank 12. The pivoting axis 54 of the bellcrank 12 is located in a corner area of the cartridge 18 adjacent to a wall 56 which separates the area in which the magnetic disc is located from the components of the door operating mechanism. The pivoting axis 54 of the bellcrank 12 is perpendicular to the bottom 26 and to the top 28 of the cartridge 18. The first arm 20 extending from the pivoting axis 54 of the bellcrank 12 is located midway between the bottom 26 and the top 28 of the cartridge 18 and moves in a plane parallel to those surfaces. The first arm 20 contains a slot 52 oriented parallel to its length and having sides which are perpendicular to the bottom 26 and to the top 28 of the cartridge 18. The width of the slot 52 is slightly greater than the cross-section of the pin 50 so that pin 50 may ride in slot 52.

Protruding from the bottom surface of the first arm 20, as seen in FIG. 6, is a short pin 58 located between the end of the slot 52 and the pivoting axis 54 of the bellcrank 12. A torsional coil spring 60 is inserted over the structure of the bellcrank 12 immediately below the first arm 20 so that its coils are concentric with the pivoting axis 54. One end portion 62 of the torsional coil spring 60 bears against the wall 56 while the other end portion 64 bears against the short pin 58. The tension in spring 60 causes the first arm 20 to rotate about the pivoting axis 54 in a counterclockwise direction as viewed in FIG. 2.

As has been mentioned, the pin 50 carried by the yoke structure 48 attached to the door extension 34 rides in the slot 52 of the first arm 20 of the bellcrank 12. Under the influence of the torsional coil spring 60, a force in the direction indicated by the arrow marked F in FIG. 7 is exerted on pin 50. The force F may be resolved into two orthogonal components, a component indicated by the arrow labeled C which tends to push the door 14 in the grooves 30 and 32 in the direction of the head access opening 16 and a force indicated by the arrow labeled S which tends to pull the door extension 34 and the door 14 inward. Thus the force exerted by bellcrank 12 tends to push the door 14 closed and to seal it against the periphery of the head access opening 16.

As best seen in FIG. 7, to assist the sealing of the door 14 on the side of the head access opening 16 opposite to that on which the components of the door operating mechanism are located, the surface 88 joining the ends of the grooves 30 and 32 is angled with respect to the plane of motion of the door, so that the outside rounded edge 90 of the door 14 contacts the surface 88 when the door 14 is closed. The contact between the outside rounded edge 90 of the door 14 and the surface 88 causes the end of the door to be pushed inward so that the door 14 seals against the sealing surface 42 located adjacent to that side of the head access opening 16.

As has been mentioned, the grooves 30 and 32 beyond the areas immediately adjacent to the head access opening 16 form a less tight fit about the door 14 than they do in the areas immediately adjacent to the head access opening 16. In the area immediately beyond edge 39 where the door extension 34 is positioned when the door 14 is closed, there are no inside edges to the grooves 30 and 32. Thus, the force exerted on pin 50 by the first arm 20 of the bellcrank 12 acting under the influence of the torsional coil spring 60 can and does pull the end of the door extension 34 slightly inward. The door 14 and door extension 34 flex slightly to allow this motion.

Just beyond that end of the door extension 34, when the door 14 is in the closed position, are located lips 66 and 68 which protrude respectively from the inside of the bottom 26 and the top 28 of the cartridge 18. Lips 66 and 68 run parallel to the side 24 of the cartridge 18 and actually form one side of portions of the grooves 30 and 32 respectively. The other side of the grooves 30 and 32 are formed, for their entire length by the inside of the side 24 of the cartridge 18. Because there are slight gaps 70 and 72 between the end of the door extension 34, when the door 14 is in the closed position, and the beginning of the lips 66 and 68 respectively, the force exerted by bellcrank 12 on the door extension 34 pulls the end of door extension 34 inward a slight amount so that the inward side corners 74 and 76 of the end of the door extension 34 are actually further away from the side wall 24 of the cartridge 18 than are the outward facing edges 78 and 80 of the lips 66 and 68 respectively, as can best be seen in FIG. 7. Thus a force exerted on door 14 at the head access opening 16, which would tend to slide the door 14 within the grooves 30 and 32, will not result in the opening of the door 14 since the inside corners 74 and 76 of the door extension will strike the ends of the lips 66 and 68 respectively. Because of this interference, door 14 is effectively locked and contaminants are prevented from inadvertently entering the cartridge 18.

The interference between the inside corners 74 and 76 of the end of the door extension 34 with the lips 66 and 68 does not prevent the door 14 from being properly opened when inserted into a disc-drive assembly. The proper opening of the door 14 is accomplished by a force applied to the second arm 22 of bellcrank 12. The second arm 22, in the preferred embodiment described herein, is angularly displaced relative to the first arm 20 by an angle of approximately 90° to 120°. In addition, the second arm 22 is displaced vertically with respect to the first arm 20 so that the second arm 22 is located more toward the top 26 of the cartridge 18 than is the first arm 20. This ensures that the components which cooperate with the second arm 22 do not interfere with the first arm 20 or the yoke structure 48. Since it is attached to the same pivot axis 54 as the first arm 20, the second arm 22 also has a plane of molten parallel to the top 26 and the bottom 28 of the cartridge 18.

An opening 82 is located in the side 24 of the cartridge at the height of the second arm 22. Through this opening 82, a pin 84 which is part of the disc-drive assembly (not shown) may extend in a direction perpendicular to the side wall 24 from that assembly into the cartridge 18. When the cartridge 18 is inserted into the disc-drive assembly, pin 84 pushes upon the second arm 22 causing the second arm 22 and hence the first arm 20 to rotate clockwise, counteracting and overcoming the force exerted by the torsional coil spring 60. During this motion, pin 50 slides within the slot 52. A force opposite to the direction of the arrow labeled F in FIG. 7 is exerted upon pin 50, and through yoke 48 upon the end of the door extension 34. The component of this force opposite to that indicated by the arrow labeled S in FIG. 7 tends to push the end of the door extension 34 outward toward the side 24 so that the inside corners 74 and 76 of the end of the door extension 34 are then closer to the side wall 24 than are the outward facing edges 78 and 80 of the lips 66 and 68 respectively. Thus, the end of the door extension 34 will no longer interfere with the lips 66 and 68 and may slide in those portions of grooves 30 and 32 adjacent to the lips 66 and 68 respectively. The component of the force in the direction opposite to that indicated by the arrow labeled C in FIG. 7 causes the door extension 34 and the door 14 to slide in the direction away from the head access opening 16, thereby retracting the door 14 from the head access opening 16. FIG. 8 is an overhead view of the present invention with the door 14 in the open position.

When the cartridge 18 is removed from the disc-drive assembly, pin 84 withdraws from the cartridge 24 through opening 82. As pin 84 withdraws from the cartridge 24, the tension in spring 60 rotates the bellcrank in a counterclockwise direction causing the door 14 to move toward and across the head access opening 16, the door 14 being forced against the sealing edge 42 by the angled surface 88 as has been described. Simultaneously the door 14 seals against the sealing surface 40 adjacent to the side of the head access opening 16 closest to the door opening mechanism. Also, the inside corners 74 and 76 of the end of the door extension 34 are pulled inward and are again in position to interfere with the lips 66 and 68 respectively so that the door 14 is effectively locked.

Thus, as the above description of the presently preferred embodiment shows, the present invention provides a closable door for a head access opening which not only effectively seals the cartridge from the ingress of contaminants when not in use, but also effectively locks the door in a closed position when not in use so that it cannot be inadvertently opened.

While the presently preferred embodiment has been described with respect to a specific configuration, variations are of course within the scope of the present invention. For example, the lips 66 and 68 may be replaced by protuberances located between the cartridge bottom 26 and top 28 and which interfere with projections that could be placed upon the end of the door extension 34 at those heights. Similarly, a torsional coil spring need not be used to force the bellcrank in a counterclockwise direction, but a linear coil spring pushing directly upon the second arm 22 from the direction opposite to that in which the pin 84 intrudes into cartridge 18 from the disc-drive assembly could be used. In yet another variation in which sealing may not be as critical, a bellcrank could be mounted with its pivoting axis perpendicular to the side of the cartridge along which the door travels. In this variation, the pin which slides in the slot of the first arm would correspondingly be oriented parallel to the top and bottom of the cartridge. This could possibly conserve space within the corner area of the cartridge for other uses. Thus, the invention is not intended to be limited to the particular embodiment specifically discussed hereinabove.

I claim:

1. A door mechanism for an opening in a wall of a cartridge, said door mechanism closing a door over said opening when said cartridge is not in use and opening said door when said cartridge is in use, comprising:

a substantially flat door slideable linearly along its length along said wall of said cartridge over said opening;

and a bellcrank rotatable about its axis in either direction and having a first arm coupled to said door, said bellcrank being biased to rotate in one direction so that said first arm forces said door to slide linearly along its length in a first direction to close over said opening when said cartridge is not in use, and having a second arm to which a force is applied when said cartridge is in use to rotate said bellcrank in the opposite direction so that said first arm forces said door to slide linearly along its length in the opposite direction, thereby opening said door.

2. A door mechanism as in claim 1 wherein said bellcrank is located within the cartridge.

3. A door mechanism as in claim 1 or 2 wherein said bellcrank is spring-loaded in order to force said door to close over said opening when said cartridge is not in use.

4. A door mechanism as in claim 2 further comprising a torsional coil spring placed concentrically around the axis of said bellcrank with one end of said coil spring pushing on one said arm of said bellcrank and the other end of said coil spring pushing on a member fixed with respect to said cartridge in order to bias said bellcrank.

5. A door mechanism as in claim 2 or 4 wherein said door carries a pin which rides in a slot in said first arm of said bellcrank in order to couple said first arm to said door.

6. A door mechanism as in claim 2 wherein the axis of said bellcrank is parallel to the plane of movement of said door.

7. A head access door mechanism for a cartridge having a top, a bottom, and sides and containing a magnetic disc nominally parallel to said top and bottom, the door of said door mechanism, when closed, sealing the head access opening on the side of the cartridge against a seal adjacent to said opening, the mechanism providing a means to prevent the opening of said door except during the proper operation of the cartridge and comprising:
grooves located adjacent to said head access opening in the top and bottom of the side of said cartridge, said grooves being narrower in the area close to said head access opening and wider in the area beyond said seal on a first side of said head access opening;
a substantially flat door slideable linearly along its length in said grooves over said head access opening;
a protuberance positioned on the side of said door toward the inside of said cartridge and protruding toward said door, said protuberance located slightly beyond the end of said door adjacent said first side of said head access opening when said door is closed and in the area where said door slides while opening; and
a rotatable bellcrank located within said cartridge having a first arm coupled to said door near that end of said door located toward the side of said head access opening where said door slides while opening, said bellcrank being spring-loaded to rotate to force said door closed and against said seal and said end of said door inward slightly beyond said protuberance so that said protuberance interferes with said end of said door and prevents said door from opening when a force is applied directly on said door at said head access opening, said bellcrank having a second arm to which a force may be applied to overcome said spring-loading and to rotate said first arm to force said end of said door outward beyond the point where it interferes with said protuberance and to force said door away from said head access opening, said door sliding in said grooves to open said head access opening.

8. A head access door mechanism as in claim 7 wherein said end of said door carries a pin which rides in a slot in said first arm of said bellcrank in order to couple said first arm to said door.

9. A head access door mechanism as in claim 8 wherein the end of said door has an inwardly extending member rigidly attached thereto, said pin having a circular cross-section, said pin being perpendicular to said top and bottom of said cartridge and being fixedly mounted on said inwardly extending member, and wherein said slot is oriented parallel to the length of said first arm, has sides perpendicular to said top and bottom, and has a width slightly larger than the cross-section of said pin.

10. A head access door mechanism as in claim 7 wherein said protuberance is a lip forming one side of a portion of said groove, the end of said lip interfering with the end of said door when said door is closed over said head access opening and preventing said door from opening when a force is applied directly on said door at said head access opening.

11. A head access door mechanism as in claim 7 wherein the axis about which said bellcrank rotates is perpendicular to said top and bottom of said cartridge.

12. A head access door mechanism as in claim 7 or 11 wherein said bellcrank is spring-loaded by a torsional coil spring whose coils are placed concentrically around the pivoting axis of said bellcrank, one end of said torsional coil spring pushing on one said arm of said bellcrank and the other end of said torsional coil spring pushing on a fixed part of said cartridge.

13. A head access door mechanism as in claim 7 wherein said door is substantially rigid and has the characteristic of being able to be flexed slightly along its length and wherein said bellcrank flexes said door slightly along its length when said door is closed causing said door to seal over said opening and the end of said door to be forced inward beyond said protuberance.

14. A head access door mechanism as in claim 13 wherein said door is substantially longer than the length of said head access opening.

15. A head access door mechanism as in claim 7 wherein said protuberance is located along one said groove and is formed by the end of a section of one said groove.

16. A cartridge for a magnetic disc or the like having a head access opening in its side through which magnetic heads are insertable when the cartridge is placed in a disc drive assembly comprising:
a substantially rigid and flat door in said cartridge adjacent said side in said opening, said door linearly slideable along its length in one direction across said opening to seal said opening and in the opposite direction along said side to uncover said opening;
guide means along side adjacent said door for guiding said door as it slides across said opening and along said side;
a protuberance positioned on the side of said door toward the inside of said cartridge and slightly beyond the end of said door when said door seals said opening, said protuberance facing said door and located slightly beyond the path along which said door slides to seal and uncover said opening;
a rotatable bellcrank locted within said cartridge, the axis of said bellcrank being generally parallel to said door, said bellcrank located generally on the side of said opening along which said door slides to uncover said opening, said bellcrank having a first arm and a second arm, said first arm coupled to said door near its end so that said door slides along its length to seal said opening when said bellcrank is rotated in one direction and to uncover said opening when said bellcrank is rotated in the other direction, said bellcrank forcing said end of door inward beyond said protuberance when said bellcrank is rotated so that said door seals said opening, whereby a force on said door applied through said head access opening from outside the cartridge cannot cause said door to slide to uncover said opening; and
a biasing means for rotating said bellcrank so that said door seals said opening.

17. A cartridge for a magnetic disc or the like as in claim 16 further comprising a small opening in a side of said cartridge near said second arm of said bellcrank and wherein said disc-drive assembly is equipped with a pin to press on said second arm of said bellcrank through said opening when said cartridge is inserted into the disc-drive assembly so that said bellcrank is rotated against said biasing means, whereby said opening is uncovered.

* * * * *